United States Patent
Kirkpatrick (10) Patent No.: US 12,528,745 B2
(45) Date of Patent: *Jan. 20, 2026

(54) METHOD TO LIMIT SILICON IN B4C PARTICULATE BASED CMC COMPOSITES

(71) Applicant: GOODRICH CORPORATION, Charlotte, NC (US)

(72) Inventor: Christopher T. Kirkpatrick, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 581 days.

This patent is subject to a terminal disclaimer.

(21) Appl. No.: 17/887,228

(22) Filed: Aug. 12, 2022

(65) Prior Publication Data

US 2024/0051878 A1 Feb. 15, 2024

(51) Int. Cl.
| | |
|---|---|
| *C04B 35/622* | (2006.01) |
| *C04B 35/563* | (2006.01) |
| *C04B 35/83* | (2006.01) |
| *C04B 41/45* | (2006.01) |
| *C04B 41/50* | (2006.01) |
| *C04B 41/91* | (2006.01) |

(52) U.S. Cl.
CPC ...... *C04B 35/62222* (2013.01); *C04B 35/563* (2013.01); *C04B 35/83* (2013.01); *C04B 41/457* (2013.01); *C04B 41/5096* (2013.01); *C04B 41/91* (2013.01); *C04B 2235/3821* (2013.01); *C04B 2235/422* (2013.01); *C04B 2235/428* (2013.01); *C04B 2235/5248* (2013.01); *C04B 2235/616* (2013.01)

(58) Field of Classification Search
CPC .................................................. C04B 35/563
See application file for complete search history.

(56) References Cited

U.S. PATENT DOCUMENTS

| | | | |
|---|---|---|---|
| 4,599,256 | A | 7/1986 | Vasilos |
| 4,613,522 | A | 9/1986 | Vasilos |

(Continued)

FOREIGN PATENT DOCUMENTS

| | | |
|---|---|---|
| CN | 106478125 | 3/2017 |
| EP | 1260729 | 11/2002 |

(Continued)

OTHER PUBLICATIONS

USPTO; Notice of Allowance dated May 17, 2024 in U.S. Appl. No. 17/242,725.

(Continued)

*Primary Examiner* — Robert A Vetere
(74) *Attorney, Agent, or Firm* — SNELL & WILMER L.L.P.

(57) ABSTRACT

A method of fabricating a composite component, includes forming a fibrous preform by forming a first ceramic particle layer over a first textile layer, the first ceramic particle layer having a first group of ceramic particles, disposing a second textile layer over the first ceramic particle layer, forming a second ceramic particle layer over the second textile layer, the second ceramic particle layer having a second group of ceramic particles, and disposing a third textile layer over the second ceramic particle layer. The method further includes densifying the fibrous preform.

18 Claims, 9 Drawing Sheets

(56) References Cited

U.S. PATENT DOCUMENTS

| | | | |
|---|---|---|---|
| 5,441,762 | A | 8/1995 | Gray et al. |
| 5,682,594 | A * | 10/1997 | Kennedy ........... C04B 35/62855 |
| | | | 428/549 |
| 6,110,535 | A | 8/2000 | Rey et al. |
| 6,855,428 | B2 | 2/2005 | Lau et al. |
| 7,378,362 | B2 | 5/2008 | Nixon et al. |
| 8,062,448 | B2 | 11/2011 | Bompard et al. |
| 8,101,272 | B1 | 1/2012 | Schmidt |
| 10,151,362 | B1 | 12/2018 | Bianco et al. |
| 10,208,412 | B2 | 2/2019 | Le Costaouec et al. |
| 10,294,166 | B2 | 5/2019 | McCaffrey et al. |
| 11,802,089 | B2 | 10/2023 | Clerambourg et al. |
| 12,036,782 | B2 * | 7/2024 | Kirkpatrick ............. B32B 18/00 |
| 2002/0176990 | A1 | 11/2002 | Johnson |
| 2004/0192534 | A1 | 9/2004 | Nixon et al. |
| 2005/0142346 | A1 * | 6/2005 | Ohnishi ............ C04B 35/62625 |
| | | | 501/87 |
| 2005/0153137 | A1 * | 7/2005 | Thompson ............... C04B 35/83 |
| | | | 428/408 |
| 2012/0195766 | A1 * | 8/2012 | Cohin ..................... F01D 5/225 |
| | | | 416/241 A |
| 2012/0258641 | A1 | 10/2012 | Bouillon et al. |
| 2014/0271161 | A1 * | 9/2014 | Lazur ................ C04B 35/62868 |
| | | | 428/221 |
| 2016/0332917 | A1 | 11/2016 | Hipp et al. |
| 2021/0094887 | A1 | 4/2021 | Poteet et al. |
| 2021/0163366 | A1 * | 6/2021 | Clerambourg .... C04B 35/62873 |
| 2021/0238097 | A1 | 8/2021 | Khan |

FOREIGN PATENT DOCUMENTS

| | | |
|---|---|---|
| EP | 1537262 | 7/2016 |
| EP | 3816137 | 5/2021 |
| EP | 3925942 | 12/2021 |
| EP | 3971333 | 3/2022 |
| EP | 4272956 | 11/2023 |
| RU | 2621241 | 6/2017 |
| WO | 2019202235 | 10/2019 |

OTHER PUBLICATIONS

USPTO; Final Office Action dated Sep. 18, 2024 in U.S. Appl. No. 17/718,925.

European Patent Office, European Partial Search Report dated Dec. 14, 2023 in Application No. 23165459.1.

European Patent Office, European Search Report dated Apr. 4, 2024 in Application No. 23190400.4.

USPTO; Notice of Allowance dated Apr. 5, 2024 in U.S. Appl. No. 17/242,725.

USPTO; Non-Final Office Action dated Mar. 14, 2024 in U.S. Appl. No. 17/718,925.

USPTO; Notice of Allowance dated Mar. 20, 2024 in U.S. Appl. No. 17/242,725.

European Patent Office, European Partial Search Report dated Jan. 11, 2024 in Application No. 23190400.4.

USPTO; Non-Final Office Action dated Dec. 18, 2024 in U.S. Appl. No. 17/718,925.

European Patent Office, European Search Report dated Oct. 28, 2021 in Application No. 21179302.1.

USPTO; Requirement for Restriction dated Apr. 6, 2023 in U.S. Appl. No. 17/718,925.

USPTO; Requirement for Restriction dated May 25, 2023 in U.S. Appl. No. 17/242,725.

European Patent Office, European Office Action dated Jul. 4, 2023 in Application No. 21179302.1.

USPTO; Non-Final Office Action dated Sep. 14, 2023 in U.S. Appl. No. 17/718,925.

USPTO; Non-Final Office Action dated Oct. 2, 2023 in U.S. Appl. No. 17/242,725.

European Patent Office, European Partial Search Report dated Sep. 13, 2023 in Application No. 23165459.1.

USPTO; Ex Parte Quayle Office Action dated Jan. 5, 2024 in U.S. Appl. No. 17/242,725.

USPTO; Non-Final Office Action dated Feb. 13, 2025 in U.S. Appl. No. 18/739,126.

USPTO; Final Office Action dated May 21, 2025 in U.S. Appl. No. 17/718,925.

USPTO; Notice of Allowance dated Jul. 2, 2025 in U.S. Appl. No. 18/739,126.

USPTO; Notice of Allowance dated Jul. 25, 2025 in U.S. Appl. No. 18/739,126.

USPTO; Non-Final Office Action dated Aug. 1, 2025 in U.S. Appl. No. 17/718,925.

USPTO; Notice of Allowance dated Aug. 26, 2025 in U.S. Appl. No. 18/739,126.

USPTO; Notice of Allowance dated Nov. 18, 2025 in U.S. Appl. No. 17/718,925.

* cited by examiner

METHOD TO LIMIT SILICON IN B4C PARTICULATE BASED CMC COMPOSITES

FIELD

The present disclosure relates to composites, and more specifically, to composites having ceramic particles and methods of forming the same.

BACKGROUND

Aircrafts typically utilize brake systems on wheels to slow or stop the aircraft during landings, taxiing, and rejected takeoffs. Aircraft brake systems generally employ a brake stack (also referred to as a heat sink) comprising a series of friction disks that may be forced into contact with one another during braking to slow or stop the aircraft. The heat sink typically comprises rotor disks and stator disks that, in response to axial compressive pressure, convert the kinetic energy of the aircraft into heat through frictional forces experienced between the friction disks. Heat sinks comprising carbon fiber carbon matrix composite (C/C) components and/or carbon fiber ceramic matrix composite (CMC) components may prove advantageous in addressing frictional and wear performance.

Next generation heat sinks are expected to exhibit greater heat capacities in order to absorb and dissipate greater amounts of heat, particularly during rejected takeoffs. However, making a C/C and/or CMC component that has the needed strength and the needed specific heat (Cp) has proven difficult. Boron or boron carbide materials possess relatively high heat capacities and thermal stability. However, difficulties arise when attempting to incorporate boron or boron carbide materials into the carbon fiber structures used to form the C/C and CMC components, resulting in limitations on the size and amounts of the high heat capacity materials that may be incorporated into the carbon fiber structures. Additionally, limiting silicon content is crucial in silicon melt infiltrated CMC composites for use in aircraft brakes; silicon has a very low Cp as compared to carbon, which limits its ability to be used as a brake/heatsink ingredient.

SUMMARY

A method of fabricating a composite component, includes forming a fibrous preform by forming a first ceramic particle layer over a first textile layer, the first ceramic particle layer having a first group of ceramic particles, disposing a second textile layer over the first ceramic particle layer, forming a second ceramic particle layer over the second textile layer, the second ceramic particle layer having a second group of ceramic particles, and disposing a third textile layer over the second ceramic particle layer. The method further includes densifying the fibrous preform.

In various embodiments, the method further includes forming a third ceramic particle layer over the third textile layer, the third ceramic particle layer having a third group of ceramic particles. Forming the first ceramic particle layer comprises depositing a first volume of boron carbide powder over the first textile layer, forming the second ceramic particle layer comprises depositing a second volume of boron carbide powder over the second textile layer, and forming the third ceramic particle layer comprises depositing a third volume of boron carbide powder over the third textile layer. The first, second, and third, textile layers comprise carbon fiber.

In various embodiments, the first group of ceramic particles has a first average particle size, the second group of ceramic particles has a second average particle size, and the third group of ceramic particles has a third average particle size. The second average particle size is less than the first average particle size and the third average particle size is less than the second average particle size.

In various embodiments, the method further includes performing a silicon melt infiltration after densifying the fibrous preform.

In various embodiments, the method further includes densifying the fibrous preform for a predetermined period of time based on the third average particle size such that pores formed in the third ceramic particle layer are smaller than pores formed in the second ceramic particle layer and the pores formed in the second ceramic particle layer are smaller than the pores formed in the first ceramic particle layer, thus limiting silicon infiltration.

In various embodiments, the method further includes locating a carbon/carbon member through the fibrous preform.

In various embodiments, the method further includes forming an opening through the carbon/carbon member.

In various embodiments, a diameter of the opening is between 25% and 75% of a diameter of the carbon/carbon member.

In various embodiments, the method further includes disposing the first textile layer on a first plate, locating a first shim around an outer perimeter of the first textile layer, locating a second shim around an outer perimeter of the second textile layer, disposing a second plate over the third textile layer, and applying a compressive load to the third textile layer. At least one of the first plate or the second plate includes at least one of a groove or an orifice.

A method of forming a fibrous preform for fabricating a composite component includes locating a first fiber layer in a mold, forming a first layer of ceramic particles and phenolic resin powder over the first fiber layer, the first layer of ceramic particles having a first group of ceramic particles, locating a second fiber layer in the mold and over the first layer of ceramic particles and phenolic resin powder, forming a second layer of ceramic particles and phenolic resin powder over the second fiber layer, the second ceramic layer of ceramic particle having a second group of ceramic particles, locating a third fiber layer over the second layer of ceramic particles and phenolic resin powder, and curing the fibrous preform.

In various embodiments, the method further includes forming a third layer of ceramic particles over the third fiber layer, the third layer of ceramic particles having a third group of ceramic particles. Forming the first layer of ceramic particles comprises depositing a first volume of boron carbide powder over the first fiber layer, forming the second layer of ceramic particles comprises depositing a second volume of boron carbide powder over the second fiber layer, and forming the third layer of ceramic particles comprises depositing a third volume of boron carbide powder over the third fiber layer. The first, second, and third, fiber layers comprise carbon fiber.

In various embodiments, the first group of ceramic particles has a first average particle size, the second group of ceramic particles has a second average particle size, and the third group of ceramic particles has a third average particle size. The second average particle size is less than the first average particle size and the third average particle size is less than the second average particle size.

In various embodiments, the method further includes curing the fibrous preform for a predetermined period of time based on the third average particle size such that pores formed in the third layer of ceramic particles are smaller than pores formed in the second layer of ceramic particles and the pores formed in the second layer of ceramic particles are smaller than the pores formed in the first layer of ceramic particles, thus limiting silicon infiltration.

In various embodiments, the method further includes locating a plurality of carbon/carbon members in the mold. The plurality of carbon/carbon members is located through each of the first fiber layer, the second fiber layer, the third fiber layer.

In various embodiments, the method further includes needling through the first fiber layer, the second fiber layer, and the third fiber layer to form a plurality of z-direction fibers extending between the first fiber layer and the third fiber layer.

In various embodiments, the first fiber layer, the second fiber layer, and the third fiber layer each have an open weave comprised of between 25% and 75% open area.

A fiber reinforced composite component includes a first fiber layer comprising a plurality of first carbon fibers, a second fiber layer comprising a plurality of second carbon fibers, a third fiber layer comprising a plurality of third carbon fibers, a first layer of ceramic particles located between the first fiber layer and the second fiber layer, the first layer of ceramic particles having a first group of ceramic particles, and a second layer of ceramic particles located between the second fiber layer and the third fiber layer, the second layer of ceramic particles having a second group of ceramic particles. The fiber reinforced composite component further includes a plurality of carbon/carbon members located through the first fiber layer, the first layer of ceramic particles, the second fiber layer, the second layer of ceramic particles, and the third fiber layer, and a carbon matrix material encapsulating the plurality of first carbon fibers, the plurality of second carbon fibers, the plurality of third carbon fibers, the plurality of carbon/carbon members, the first layer of ceramic particles, and the second layer of ceramic particles. The carbon matrix material defines a plurality of pores. The fiber reinforced composite component further includes a silicon material located in the plurality of pores.

In various embodiments, the fiber reinforced composite component further includes a third layer of ceramic particles over the third fiber layer, the third layer of ceramic particles having a third group of ceramic particles. The first layer of ceramic particles comprises a first volume of boron carbide powder, the second layer of ceramic particles comprises a second volume of boron carbide powder, and the third layer of ceramic particles comprises a third volume of boron carbide powder. The first, second, and third, fiber layers comprise carbon fiber.

In various embodiments, the first group of ceramic particles has a first average particle size, the second group of ceramic particles has a second average particle size, and the third group of ceramic particles has a third average particle size. The second average particle size is less than the first average particle size and the third average particle size is less than the second average particle size.

In various embodiments, the fiber reinforced composite is densified for a predetermined period of time based on the third average particle size such that pores formed in the third ceramic particle layer are smaller than pores formed in the second ceramic particle layer and the pores formed in the second ceramic particle layer are smaller than the pores formed in the first ceramic particle layer, thus limiting silicon infiltration.

The foregoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Provided herein, according to various embodiments, are fiber reinforced composite parts and method(s) for fabricating fiber reinforced composite parts, such as brake disks, having ceramic particle layers interspersed between fiber layers. Particularly, the methods include limiting silicon resulting in parts with a higher Cp. For instance, to reduce levels of silicon, the core, or middle of the disk, may preferentially use finer $B_4C$ grit mixtures (e.g., grit sizes of approximately 240-400) whereas the outer surfaces may use courser grit size mixtures (e.g., grit sizes of approximately 60-120). In various embodiments, each layer may have a grit size mixture that is tailored for grit sizes of the finest grit in the mixture that gets smaller the closer to the core the layer gets. The center layers use the finest grit to prevent the center of the disk from picking up silicon after chemical vapor deposition (CVD). Accordingly, a more uniform densification gradient may be achieved due to the reduction of silicon uptake in the core. Further, the smaller grit size closes porosity to silicon, preventing silicon accumulation in the core, thus yielding a higher overall Cp brake with less silicon. Silicon on the outer surfaces would still offer the benefits of higher strength and oxidation protection.

While numerous details are included herein pertaining to aircraft components, such as brake components, the components and method(s) disclosed herein can be applied to fabricate other carbon fiber-reinforced/carbon matrix composite (C/C) components that benefit from better wear performance and increased specific heat (Cp).

Figure 1:
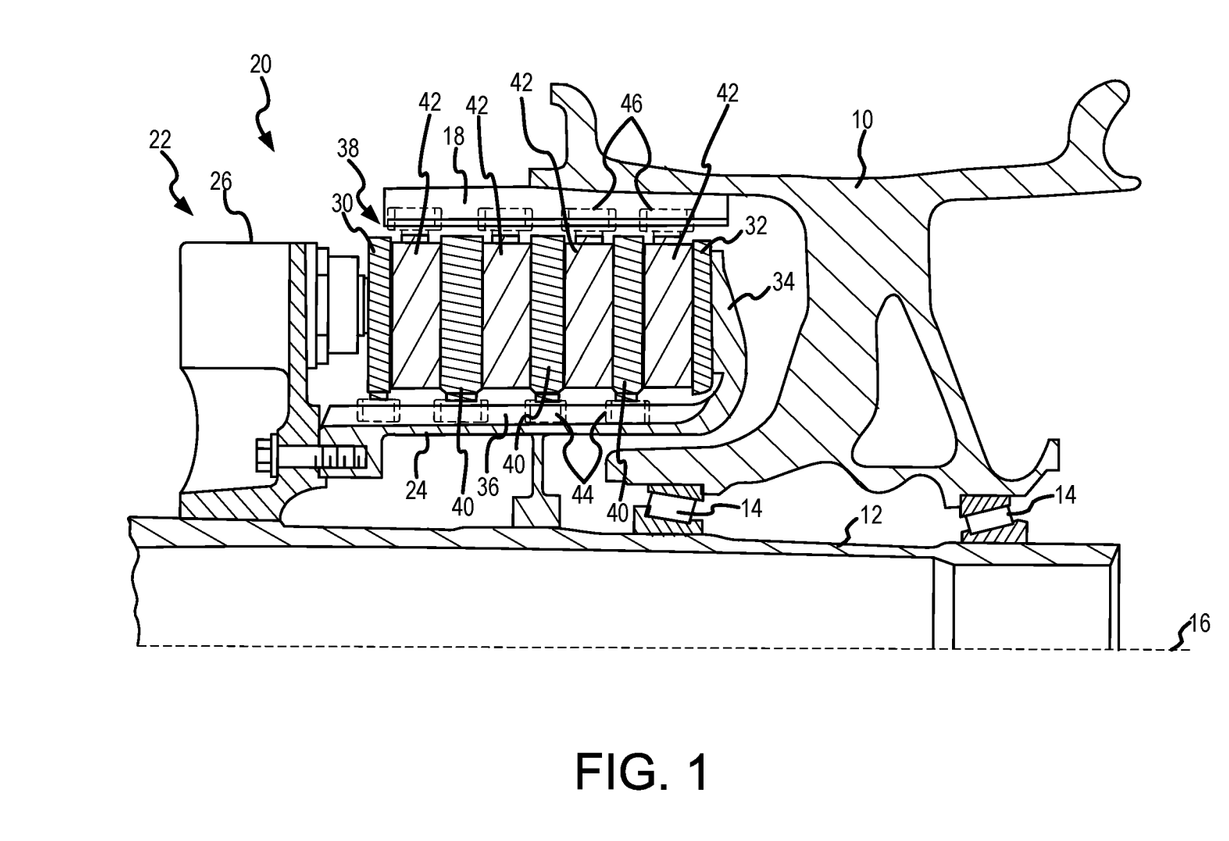
FIG. 1 illustrates a multi-disk brake assembly, in accordance with various embodiments.

With reference to FIG. 1, a multi-disk brake assembly 20 is illustrated, in accordance with various embodiments. Multi-disk brake assembly 20 is mounted on an axle 12 for use with a wheel 10 disposed on and configured to rotate about the axle 12 via one or more bearing assemblies 14. A central axis 16 extends through the axle 12 and defines a center of rotation of the wheel 10. A torque tube 24 (sometimes referred to as a torque plate barrel or a torque plate) is aligned concentrically with the central axis 16. Wheel 10 is rotatable relative to the torque tube 24. Torque tube 24 includes a series of axially extending stator splines 36 (one shown). Wheel 10 includes a series of axially extending rotor splines 18 (one shown). Rotation of wheel 10 is modulated by multi-disk brake assembly 20.

Multi-disk brake assembly 20 includes a plurality of brake disks 38. The plurality of brake disks 38 includes at least one non-rotatable friction disk 40 (also referred to as a stator disk), and at least one rotatable friction disk 42 (as referred to as a rotor disk). Each of the brake disks 38 includes an attachment structure. For example, each of the stator disks 40 includes a plurality of stator lugs 44 at circumferentially spaced positions around an inner circumference of the stator disk 40, and each of the rotor disks 42 includes a plurality of rotor lugs 46 at circumferentially spaced positions around an outer circumference of the rotor disk 42.

Brake disks 38 may also include an end plate 32 and a pressure plate 30. end plate 32 and pressure plate 30 are located on opposing axial ends of the brake disk stack relative to one another. End plate 32 is connected to, or is otherwise frictionally engaged with, a reaction plate 34 of torque tube 24. End plate 32 is non-rotatable by virtue of its connection to torque tube 24. Stator splines 36 may support pressure plate 30 such that pressure plate 30 is also non-rotatable. Stator splines 36 may also support non-rotatable stator disks 40. Stator splines 36 are located in gaps formed between the stator lugs 44 of the stator disk 40. Similarly, rotor splines 18 gaps formed between the rotor lugs 46 of the rotor disk 42. Rotor disks 42 may be rotatable by virtue of their engagement with rotor splines 18 of wheel 10.

An actuating mechanism for the multi-disk brake assembly 20 includes a plurality of piston assemblies 22 (one shown) circumferentially spaced around a piston housing 26. Upon actuation, the plurality of piston assemblies 22 affects a braking action by urging pressure plate 30, stator disks 40, and end plate 32 into frictional engagement with the rotor disks 42. Through compression of the plurality of rotor disks 42 and the plurality of stator disks 40 between the pressure plate 30 and the end plate 32, the resulting frictional contact slows or stops or otherwise prevents rotation of the wheel 10.

In various embodiments, one or more of the friction disks (e.g., rotor disks 42, stator disks 40, pressure plate 30, end plate 32) are fabricated from composite materials, such as, for example, C/C and/or CMC, that enable the brake disks to withstand and dissipate the heat generated during and following a braking action. In various embodiments, the non-rotating frictional components of multi-disk brake assembly 20 (i.e., pressure plate 30, end plate 32, and stator disks 40) may comprise a material that is different from the material of the rotating frictional component (e.g., rotor disks 42). For example, in various embodiments, rotor disks 42 comprise C/C and pressure plate 30, end plate 32, and/or stator disks 40 may comprise CMC. In various embodiments, rotor disks 42 and/or stator disks 40 may comprise a core made of a first material (e.g., CMC) and wear liners attached to the core that are made of a second, different material (e.g., C/C).

In accordance with various embodiments, one or more of the friction disks are comprised of a C/C material having high specific heat particles interspersed throughout the friction disk, where high specific heat particles includes any particle or powder (typically ceramic) that raises the specific heat of the disk above that of C/C alone. For example, in various embodiments, the friction disk may comprise a C/C that includes a percentage of boron, boron carbide ($B_4C$), a boron component, or other material having a high specific heat (i.e., a specific heat greater than the specific heat of the C/C alone).

As described in further detail below, the process of interspersing the boron carbide (or other high specific heat particles) into the C/C is performed by depositing a ceramic powder (e.g., boron carbide powder) between one or more fiber layers of the fibrous preform used to form the friction disk. In accordance with various embodiments, the ceramic powder may comprise a mix of difference size ceramic particles. After forming the fibrous preform, including one or more layers of ceramic particles, the fibrous preform is densified using chemical vapor infiltration (CVI) and/or chemical vapor deposition (CVD). During densification, a matrix material (e.g., a carbon matrix) is deposited on and encapsulates the ceramic particles and the fibers of the fiber layers. In various embodiments, after densification, a silicon melt infiltration is performed to form a silicon layer over the carbon matrix. Depositing ceramic powder between the fiber layers may allow greater volumes of high specific heat particles to be included in the composite part. Increasing the volume of high specific heat particles may decrease a porosity and/or increase a density of the final composite component. Further, greater volumes of high specific heat particles may reduce the volume of silicon material in the final composite component and/or may increase the specific heat of the final composite component.

Figure 2:
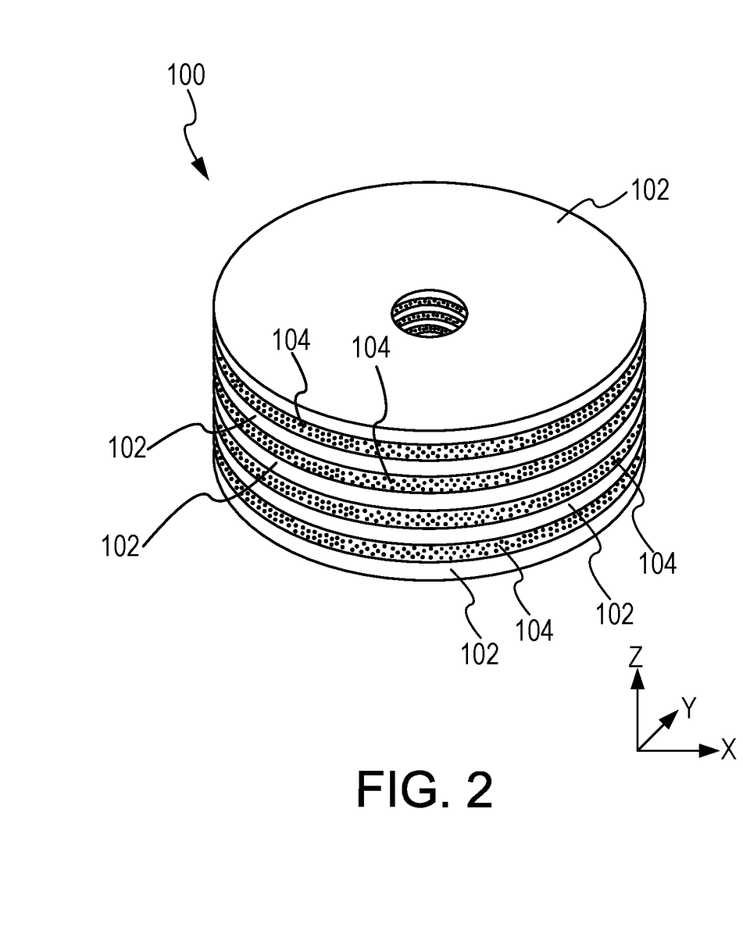
FIG. 2 illustrates a fibrous preform including ceramic particle layers interspersed between fiber layers, in accordance with various embodiments.

Referring now to FIG. 2, a fibrous preform 100 is illustrated, in accordance with various embodiments. Fibrous preform 100 may be employed to form a friction disk, as described above. Fibrous preform 100 may comprise a plurality of stacked fiber layers 102. Each fiber layer 102 has a first dimension in the axial, or "Z", direction that may be substantially less than the dimensions of the fiber layer 102 in the radial and circumferential directions. As used herein, the term "axial" refers to directions parallel with central axis 16 in FIG. 1 (e.g., parallel to the Z-axis on the provided X-Y-Z axes). As used herein, the term "radial" refers to directions perpendicular to central axis 16 in FIG. 1 (e.g., directions parallel to a plane formed by the X-axis and the Y-axis). For example, a first component that is radially outward of a second component is located a greater distance from central axis 16 as compared to the second component. As used herein, the term "circumferential" refers to directions about central axis 16 in FIG. 1 (e.g., directions about the Z-axis).

In accordance with various embodiments, fiber layers 102 comprises woven, braided, or knitted carbon fibers. In various embodiments, one or more of the fiber layers 102 may comprise carbon fibers in an open weave pattern (i.e., a weave wherein there is increased distance between the warp tows and between the weft tows). In various embodiments, each fiber layer 102 is between 15% and 95% open area. As used herein "open area" refers to the area that does not include carbon fibers. For example, a fiber layer 102 having 25% open area means 75% of the total area of the fiber layer 102 is carbon fiber. In various embodiments, fiber layer 102 is between 25% and 75% open area. In various embodiments, fiber layer 102 is between 25% and 50% open area. In various embodiments, the open area may vary between fiber layers 102. In this regard, a first fiber layer 102 may include a first open area and a second fiber layer 102 may include a second open area that is different from the first opening area. Employing open weave patterns tends to make fiber layer 102 generally easier to shape.

In various embodiments, one or more of the fiber layers 102 may comprise stretch-broken carbon fibers. Employing stretch-broken carbon fibers tends to increase the bonding or securing of the ceramic particles (e.g., $B_4C$ powder) within the fiber layer and the composite part. In various embodiments, the carbon fibers may be derived from polyacrylonitrile (PAN), rayon (synthetic fiber derived from cellulose), oxidized polyacrylonitrile fiber (OPF), carbon pitch, or the like. The starting fiber may be pre-oxidized PAN or fully carbonized commercial carbon fiber. The fiber layers 102 may be formed or cut having any desired shape or form. For example, the fiber layers 102 may have any shape such as, for example, a polygon, circular, triangle, square, rectangle, pentagon, hexagon, octagon, or any other desired shape. In various embodiments, fiber layers 102 and fibrous preform 100 may have a generally annular shape. In various embodiments, fiber layers 102 and fibrous preform 100 may have a generally annular shape with protrusions extending radially outward from the outer circumferential surface. In various embodiments, fiber layers 102 and fibrous preform 100 may have a generally annular shape with protrusions extending radially inward from the inner circumferential surface.

In accordance with various embodiments, fibrous preform 100 includes one or more ceramic particle layers 104. Each ceramic particle layer 104 is located between a pair of adjacent fiber layers 102. In various embodiments, ceramic particle layers 104 may be comprised of boron carbide particles. A range of particle sizes (or powder sizes) may be employed in the ceramic powders used to fabricate the ceramic particle layers 104. For example, in various embodiments, a boron carbide powder between 10 grit and 400 grit may be selected for ceramic particle layers 104. In various embodiments, a boron carbide powder between 100 grit and 400 grit may be selected for ceramic particle layers 104. In various embodiments, a boron carbide powder between 100 grit and 320 grit may be selected for ceramic particle layers 104. In various embodiments, a 240 grit boron carbide powder may be used to form ceramic particle layers 104. Stated differently, the boron carbide particles may have an average particle size between about 22 micrometers (μm) and about 1854 μm, between about 22 μm and about 122 μm, between about 31 μm and about 122 μm, and/or about 51 μm (i.e., between about 0.00047 inches and about 0.073 inches, between about 0.00047 inches and about 0.0048 inches, between about 0.00122 inches and about 0.0048 inches, and/or about 0.0020 inches). As used in the previous context only, the term "about" means plus or minus ten percent of the associated value.

In various embodiments, one or more of the ceramic particle layer 104 may include a mixture of particle sizes. In various embodiments, the ceramic particle layer 104 comprises a first group of ceramic particles (e.g., $B_4C$ particles) having a first average particle size and a second group of particles having a second average particle size greater than the first average particle size. In various embodiments, the ceramic particles of the first group may have a first average particle size between 20 grit and 180 grit, between 20 grit and 100 grit, between 50 grit and 100 grit, or between 50 grit and 60 grit. Stated differently, the first group of ceramic particles (e.g., $B_4C$ particles) may have a first average particle size between 1.0 mm and 82.0 μm (between 0.039 inches and 0.003 inches), between 1.0 mm and 162.0 μm (between 0.039 inches and 0.006 inches), between 336.0 μm and 162.0 μm (between 0.013 inches and 0.006 inches), or between 336.0 μm and 269.0 μm (between 0.013 inches and 0.011 inches).

In various embodiments, the ceramic particles of the second group have a second average particle size between 100 grit and 400 grit, between 100 grit and 320 grit, or between 120 grit and 240 grit. Stated differently, the second group of ceramic particles (e.g., $B_4C$ particles) may have a second average particle size between 162.0 μm and 35.0 μm (between 0.006 inches and 0.001 inches), between 162.0 μm and 46.2 μm (0.006 inches and 0.0018 inches), or between 125 μm and 58.5 μm (0.005 inches and 0.0023 inches).

In various embodiments, the ceramic particles of the first average particle size (i.e., the larger particle size) form a larger weight percentage of particle mixture as compared to the weight percentage formed by the ceramic particles of the second average size. For example, the ceramic particle mixture of one or more of the ceramic particle layer(s) 104 may comprise from 55% to 95% by weight ceramic particles having the first average particle size and from 45% to 5% by weight ceramic particles having the second average particle size. In various embodiments, the ceramic particle mixture of one or more of the ceramic particle layer(s) 104 may comprise from 70% to 90% by weight ceramic particles having the first average particle size and from 30% to 10% by weight ceramic particles having the second average particle size. In various embodiments, the ceramic particle mixture of one or more of the ceramic particle layer(s) 104 may comprise from 80% to 90% by weight ceramic particles having the first average particle size and from 20% to 10% by weight ceramic particles having the second average particle size. In various embodiments, the ceramic particle layers 104 may include a mixture of ceramic powder and phenolic resin powder. The phenolic resin powder may form, for example, between 0.5% and 15%, between 1.0% and 10.0%, or between 2.0% and 8.0% by weight of the total ceramic-powder-phenolic-resin powder mixture. Phenolic resin powder tends to facilitate even distribution of the ceramic powder.

Figure 3:
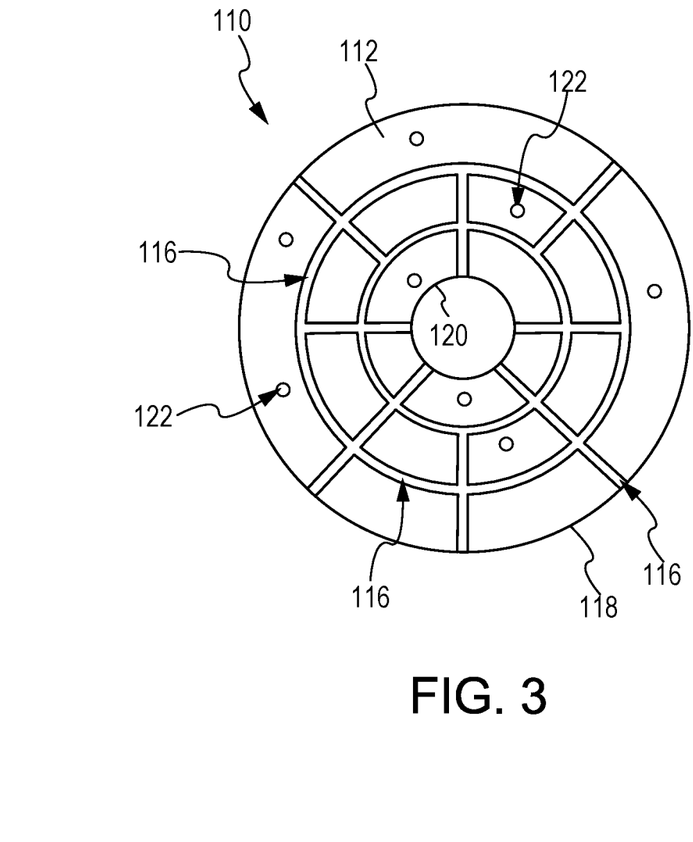
FIG. 3 illustrates a plate for facilitating formation and densification of a fibrous preform having ceramic particle layers interspersed between fiber layers, in accordance with various embodiments.
Figure 4A:
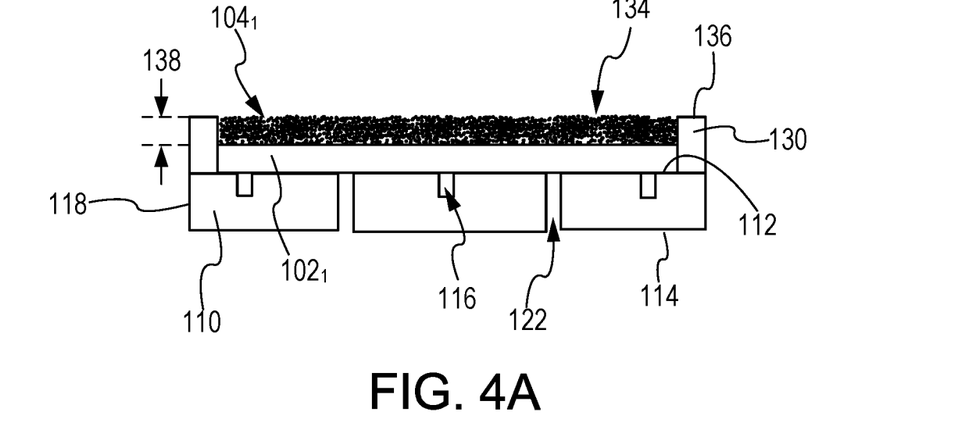
FIGS. 4A, 4B, 4C, and 4D illustrate formation of a fibrous preform including ceramic particle layers, in accordance with various embodiments.
Figure 4B:
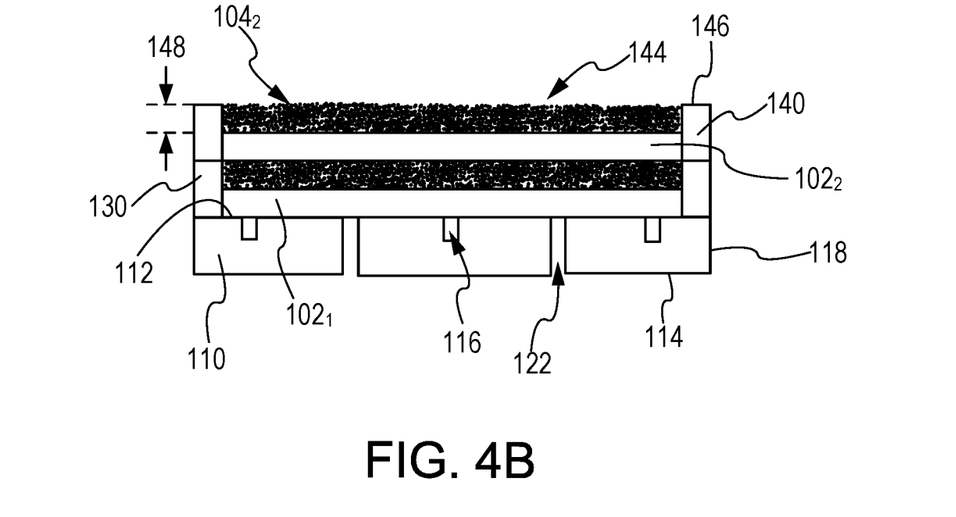
Figure 4C:
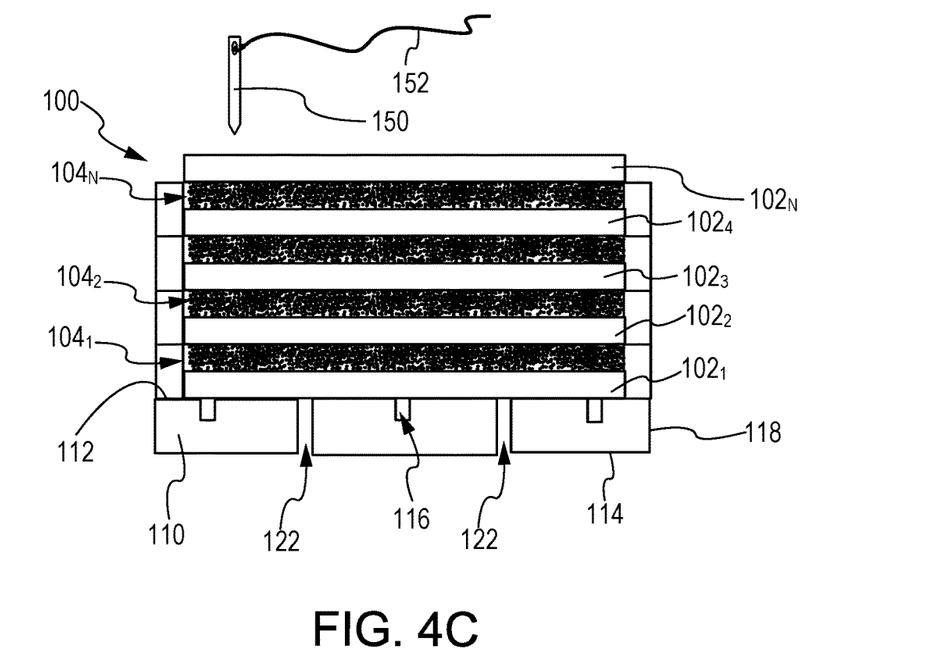

With reference to FIGS. 4A, 4B, and 4C, formation of fibrous preform 100 is illustrated, in accordance with various embodiments. In FIG. 4A, a first fiber layer 102₁ is located on a plate 110. FIG. 3 illustrates plate 110. With combined reference to FIGS. 3 and 4A, plate 110 includes opposing surfaces 112 and 114. First fiber layer 102₁ may be located on surface 112 of plate 110. A plurality of grooves, or channels, 116 may be formed into surface 112. Stated differently, surface 112 of plate 110 may define grooves 116.

Grooves 116 may extend from an outer circumferential surface 118 and/or from an inner circumferential surface 120 of plate 110. In various embodiments, plate 110 may include one or more orifices 122 extending from surface 112 to surface 114. Grooves 116 and orifices 122 tend to facilitate the flow of gas into the fibrous preform during densification. Grooves 116 and orifices 122 may be formed in any desired pattern. While plate 110 is illustrated as having an annular shape, it is contemplated and understood that plate 110 may have any desired shape. In various embodiments, the shape of plate 110 matches the shape of fiber layers 102.

With continued reference to FIG. 4A, a first shim, or spacer, 130 is located around an outer perimeter (or outer circumference) 132 of first fiber layer $102_1$. For fiber layers having an annular shape, a shim is also located along the inner perimeter (or inner circumference). With first shim 130 in place, boron carbide powder 134 is deposited (e.g., poured) over first fiber layer $102_1$. The boron carbide powder 134 is deposited until, at least, an upper surface 136 of first shim 130 is reached (i.e., until the volume defined by first shim 130 and first fiber layer $102_1$ is filled, or substantially filled, with boron carbide powder 134). In various embodiments, a scrapper or leveler may be translated (i.e., slid) over boron carbide powder 134 and first shim 130 to remove any portion of boron carbide powder 134 which may be extending beyond upper surface 136 of first shim 130. In this regard, after scraping, the boron carbide powder 134 forms a first ceramic particle layer $104_1$ having a thickness 138.

With reference to FIG. 4B, a second fiber layer $102_2$ is located over first ceramic particle layer $104_1$. A second shim 140 is located over first shim 130 and around the outer perimeter of second fiber layer $102_2$. For fiber layers 102 having an annular shape, a shim is also located along the inner perimeter (or inner circumference) of the fiber layer 102. With second shim 140 in place, ceramic powder 144 is deposited (e.g., poured) over second fiber layer $102_2$. The ceramic powder 144 is deposited until at least an upper surface 146 of second shim 140 is reached (i.e., until the volume defined by second shim 140 and second fiber layer $102_2$ is filled, or substantially filled, with ceramic powder 144). In various embodiments, a scrapper or leveler may be translated or slid over ceramic powder 144 and second shim 140 to remove any portion of ceramic powder 144 which may be extending beyond upper surface 146 of second shim 140. In this regard, after scraping, the ceramic powder 144 forms a second ceramic particle layer $104_2$ having a thickness 148. Thickness 148 may be equal to thickness 138 (FIG. 4A). This process may be repeated until a desired number of fiber layers 102 and ceramic particle layers 104 is achieved (i.e., stacked).

With reference to FIG. 4C, once the desired number of fiber layers 102 and ceramic particle layers 104 have been formed (i.e., stacked), the fibrous preform 100 is needled. For example, a needle 150 may be used to weave a carbon fiber 152 between first fiber layer $102_1$ and final fiber layer $102_N$. In this regard, carbon fiber 152 may extend in the Z (or axial) direction between fiber layers 102. In various embodiments, a needling operation may be performed after each fiber layer 102 is stacked or at any desired interval. In this regard, the fibrous preform 100 may include Z-direction fibers of varying axial length. For example, one tow of Z-direction fibers may extend between the first fiber layer $102_1$ and the second fiber layer $102_2$, another tow of Z-direction fibers may extend between the first fiber layer $102_1$ and the third fiber layer $102_3$, another tow of Z-direction fibers may extend between the first fiber layer $102_1$ and the final fiber layer $102_N$, another tow of Z-direction fibers may extend between the final fiber layer $102_N$ and the second fiber layer $102_2$, etc.

Figure 4D:
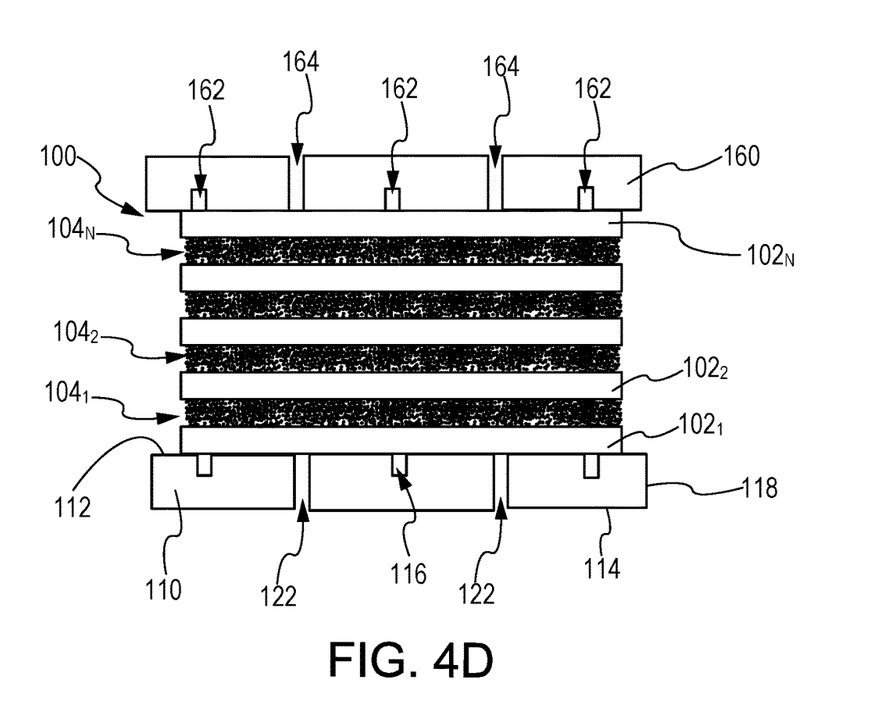

With reference to FIG. 4D, after needling, the shims are removed and a plate 160 is located over the final fiber layer $102_N$. In this regard, plate 110 and plate 160 are located over opposing ends of fibrous preform 100. Plate 160 may include grooves 162 and/or orifices 164, similar to grooves 116 and orifices 122 in plate 110.

In accordance with various embodiments, a compressive load may be applied to fibrous preform 100. For example, in response to removing the shims, the weight of plate 160 may compress fibrous preform 100 between plate 110 and plate 160. In various embodiments, a compressive load may be applied to plate 160 to compress fibrous preform 100 between plate 110 and plate 160. In various embodiments, one or more clamps may be attached between plate 110 and plate 160. The clamps are configured to compress fibrous preform 100 between plate 110 and plate 160.

Fibrous preform 100 and plates 110, 160 are then placed in a CVI/CVD furnace for densification. After densification (i.e., once a desired density and/or a desired volume of carbon matrix is achieved), a silicon melt infiltration (SMI) may be performed to fill, or substantially fill, any remaining porosity (e.g., any pores in the matrix material).

In various embodiments, heat is added to the fibrous preform 100 during a press cure process. For example, a tool may be a heated press whereby heat is conducted from the tool into the fibrous preform 100. In various embodiments, tool 120 may be placed in an oven or heated platen press before or during the press process. In various embodiments, components of the tool may be heated in an oven or heated platen press prior to being introduced to the fibrous preform 100, for example to a shape forming temperature of between 150° F. and 400° F. (65° C.-205° C.) in various embodiments, between 200° F. and 350° F. (93° C.-177° C.) in various embodiments, between 200° F. and 300° F. (93° C.-149° C.) in various embodiments, and between 225° F. and 275° F. (107° C.-135° C.) in various embodiments.

In various embodiments, after densification and prior to SMI, fiber-reinforced composite component 100 may be machined to form the final desired part shape. The machining may also expose/open a fresh carbon surface. This fresh surface tends to be easier for molten silicon to wet-out. In this regard, machining the surfaces of the densified preform may allow the silicon to better wet the preform surfaces during SMI.

In various embodiments, there are a plurality of ceramic particle layers between the first ceramic particle layer $104_1$ and a final ceramic particle layer $104_N$. If, for instance, there are three ceramic particle layers, the first ceramic particle layer $104_1$ and the final ceramic particle layer $104_N$ are outer layers with second ceramic particle layer $104_2$ as a middle layer. The middle, or center, relative to the axial direction, of the disk may be composed of finer $B_4C$ grit mixtures (e.g., grit sizes of approximately 240-400) whereas the outer surfaces may use courser grit size mixtures. For instance, a fine grit size may be a 220-400 grit size (e.g., particles with a diameter less than 60.0 microns), a medium grit size may be a 120-180 grit size (e.g., particles with a diameter between 60.0-100.0 microns), and a course grit may be a 60-100 grit size (e.g., particles with a diameter greater than 100.0 microns), approximately. Using smaller sizes in the current CVD process, "self-limits" penetration of silicon. In other words, when the pores get small enough during the reaction between silicon and carbon during the melt infiltration process, the conversion process actually blocks off more or further infiltration. For instance, in a 300-hour CVD cycle, grit sizes of 240-400 tend to "seal off". For instance, the pore size is reduced to zero (e.g., the pore is closed). Accordingly, smaller grit sizes may be used toward the center layer with larger grit sizes on the outside to tailor the depth of penetration. The full infiltration on the outer layer (e.g., 6.35 mm) can serve as oxidation protection while limiting the detrimental specific heat effect of the silicon throughout by varying the smallest grit size one gets to the center of the part. Accordingly, there is a relationship between the $B_4C$ grit size and the number of hours of CVD. Based on the $B_4C$ grit size and the number of hours of CVD, the penetration depth of the silicon may be controlled.

For example, if all the different grit mixtures (e.g., the first and second group of ceramic particles) comprise a coarser grit of 60 grit, the outside, or first ceramic particle layer $104_1$, may have a 60 grit/120 grit mixture. For instance, the 60 grit/120 grit mixture may include 80% 60 grit and 20% 120 grit Each ceramic particle layer may be 0.10 inches (i.e., 2.54 mm), where the following layer may be a 60 grit/150 grit combination (e.g., 80%/20%, respectively), followed by a 60 grit/180 grit combination (e.g., 80%/20%, respectively), and a 60 grit/240 grit (e.g., 80%/20%, respectively) at the center, or core, of the component such that the reaction forms pores that vary in size from larger to smaller. Typically, the outside densifies more readily than the inside because the pore network is the same throughout the part, but by varying the grit size combinations from outside to inside, the part can more uniformly densify because the smaller grit pickup CVD density more quickly, and thus also seal more quickly. As another example, the center may comprise a 60 grit and 400 grit combination, thereby resulting in no silicon infiltration in the core. A 60 grit/150 grit combination may be used on the outer surfaces so that you limit the penetration to only where a coarser grit mixture is utilized. Further, the CVD run times coincide with the grit sizes and resulting porosity. In other words, as the CVD processing hours increase, the pore sizes decreases, thus allowing less silicon to penetrate.

Figure 5A:
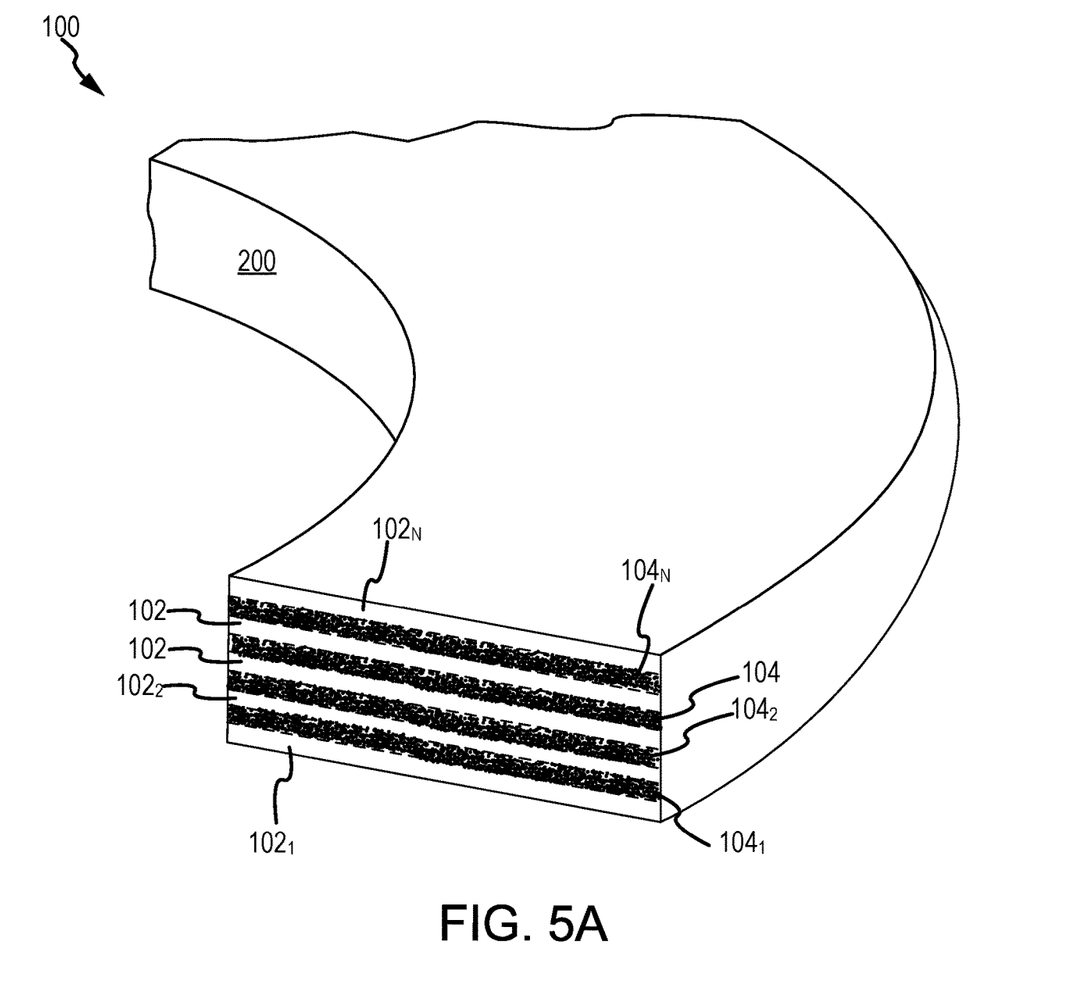
FIG. 5A illustrates a cross-section view of a fibrous preform after densification and silicon melt infiltration, in accordance with various embodiments.

FIG. 5A shows a cross-section view of fibrous preform 100 after densification and SMI. After densification and SMI, fibrous preform 100 forms a fiber-reinforced composite component 200. Stated differently, the densified and silicon infiltrated fibrous preform is a fiber-reinforced composite component. The porosity, or open space, between the carbon fibers of fiber layers 102 and between the ceramic particles of ceramic particle layers 104 is filled, or substantially filled, with carbon matrix. It is contemplated and understood that boron carbide particles may infiltrate and be located within the fiber layers 102.

Figure 5B:
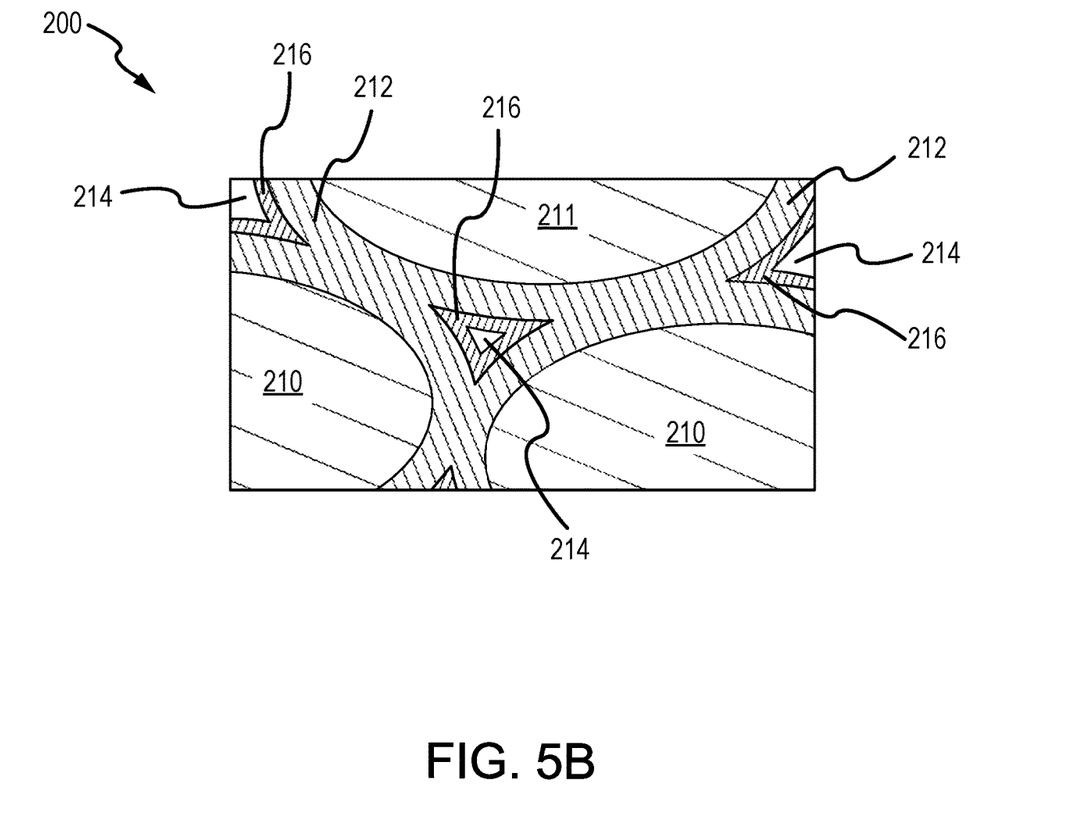
FIG. 5B illustrates a magnified view of a portion of the fibrous preform of FIG. 5A, in accordance with various embodiments.

With reference to FIG. 5B, a magnified view of a portion of fiber-reinforced composite component 200 (i.e., fibrous preform 100 after densification and SMI) is illustrated. Boron carbide particles 210 and carbon fibers 211 are coated and/or encapsulated with matrix material (e.g., carbon) 212. Stated differently, matrix material 212 is located in the porosity (i.e., open volume) between adjacent boron carbide particles 210, between adjacent carbon fibers 211, and between adjacent boron carbide particles 210 and carbon fibers 211. During SMI, silicon 214 infiltrates the porosity (i.e., open volume) in the matrix material 212. A layer of silicon carbide 216 may be formed at the interface between the silicon 214 and the carbon of matrix material 212. The silicon 214 and silicon carbide 216 coating over the matrix material 212 and the boron carbide particles 210 tends to protect the boron carbide from moisture, which reduces the risk of boron trioxide ($B_2O_3$) formation, at increased temperatures, and/or subsequent boric acid formation. Decreasing boron trioxide ($B_2O_3$) and/or boric acid formation tends to reduce the material loss and/or the material recession associated with increased volumes of boron carbide.

In various embodiments, after densification and prior to SMI, fibrous preform 100 may have an open porosity of less than 15%, less than 10%, or less than 8%. In this regard, the open volume defined by the matrix material 212 may form less than 15%, less than 10%, or less than 8% of the total volume of densified fibrous preform 100. In various embodiments, after SMI, fiber-reinforced composite component 200 may have an open porosity of less than 2% or less than 1%. In this regard, the pores, or open volume, of fiber-reinforced composite component 200 may form less than 2% or less than 1% of the total volume of fiber-reinforced composite component 200. In various embodiments, the silicon material (e.g., the silicon 214 and the silicon in the silicon carbide 216) may form less than 10%, less than 8%, or less than 5% of a total weight of fiber-reinforced composite component 200.

In accordance with various embodiments, the volume of ceramic powder having the first average particle size and the second average particle size are selected such that a ratio of the weight of the ceramic powder to the weight of the silicon in the fiber-reinforced composite component 200 is at least 2.25:1. In various embodiments, the ratio of the weight of the ceramic powder to the weight of the silicon in the fiber-reinforced composite component 200 may be between 2.25:1 and 15:1, between 2.25:1 and 5:1, between 2.25:1 and 3:1, or between 2.25:1 and 2.5:1, and/or at least 2.3:1. A ratio of 2.25:1 or greater is associated with an increased specific heat of fiber-reinforced composite component 200, relative to C/C alone. Increasing the ratio of ceramic powder to silicon (e.g., $B_4C$ to silicon) in fiber-reinforced composite component 200 tends to increase the specific heat of fiber-reinforced composite component 200. In this regard, the specific heat of fiber-reinforced composite component 200 may be tailored by increasing the volume ceramic powder and/or decreasing the volume of silicon. In various embodiments, fiber-reinforced composite component 200 may include, by weight percentage, between 30% and 90% boron carbide, between 40% and 80% boron carbide, and/or between 65% and 70% boron carbide. Fiber-reinforced composite component 200 may thus exhibit similar properties (e.g., strength, ductility, reduced crack propagation, etc.) to C/C alone, but with an increased specific heat. Stated differently, fiber-reinforced composite component 200 is a CMC material having a greater specific heat than C/C, while exhibiting the other properties of C/C.

Figure 6A:
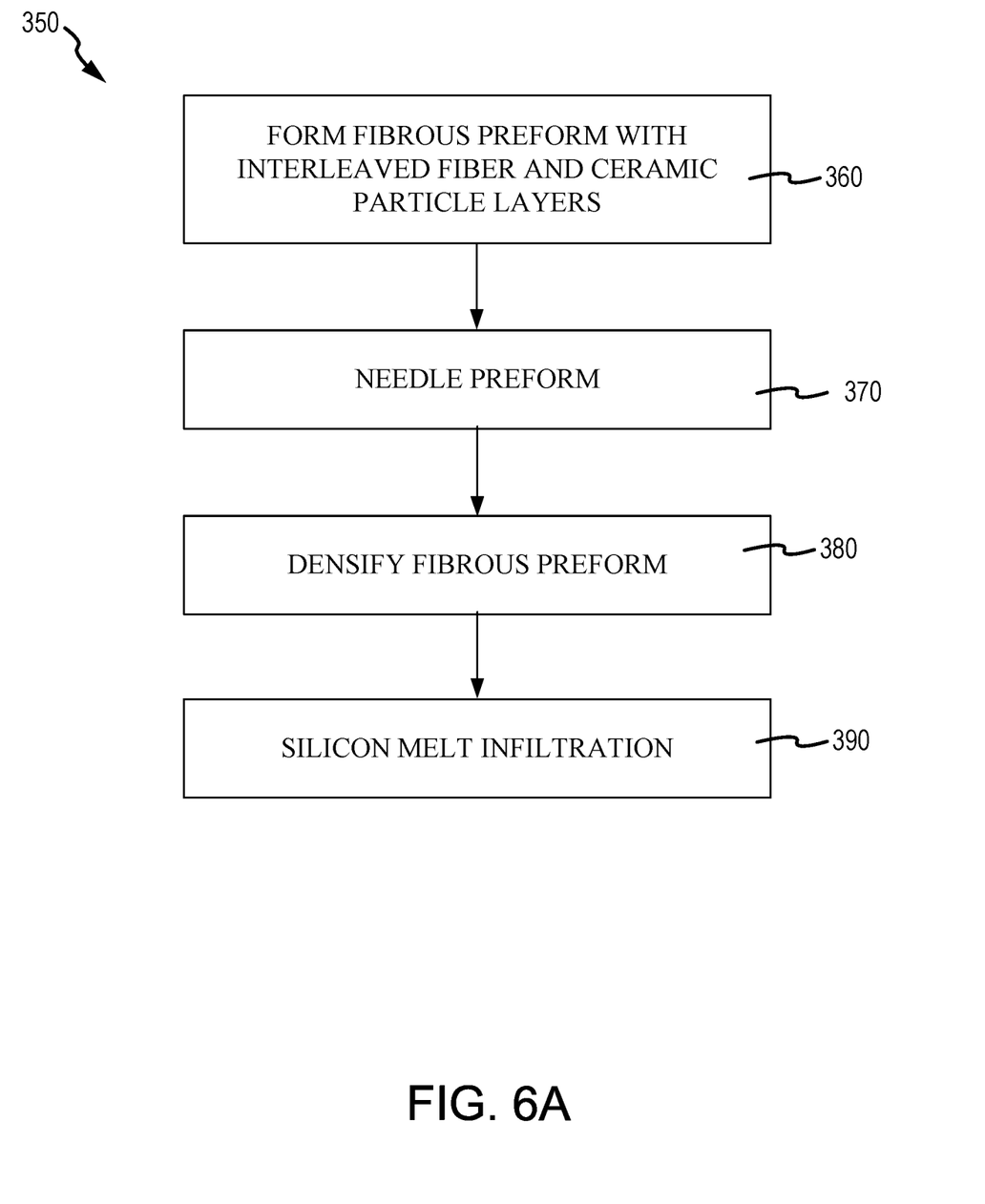
FIGS. 6A, 6B, and 6C illustrate a method of forming a fibrous preform and a composite component, in accordance with various embodiments.

With reference to FIG. 6A, a method 350 of fabricating a composite component is illustrated. In accordance with various embodiments, method 350 may include forming a fibrous preform (step 360), needling the fibrous preform (step 370), densifying the fibrous preform (step 380), and performing a silicon melt infiltration (step 390). In various embodiments, a machining operation may be performed after densification (after step 380) and prior to the silicon melt infiltration (prior to step 390). In this regard, method 350 may include machining the densified fibrous preform to near net-shape (e.g., to a final desired part shape) prior to performing the silicon melt infiltration.

Figure 6B:
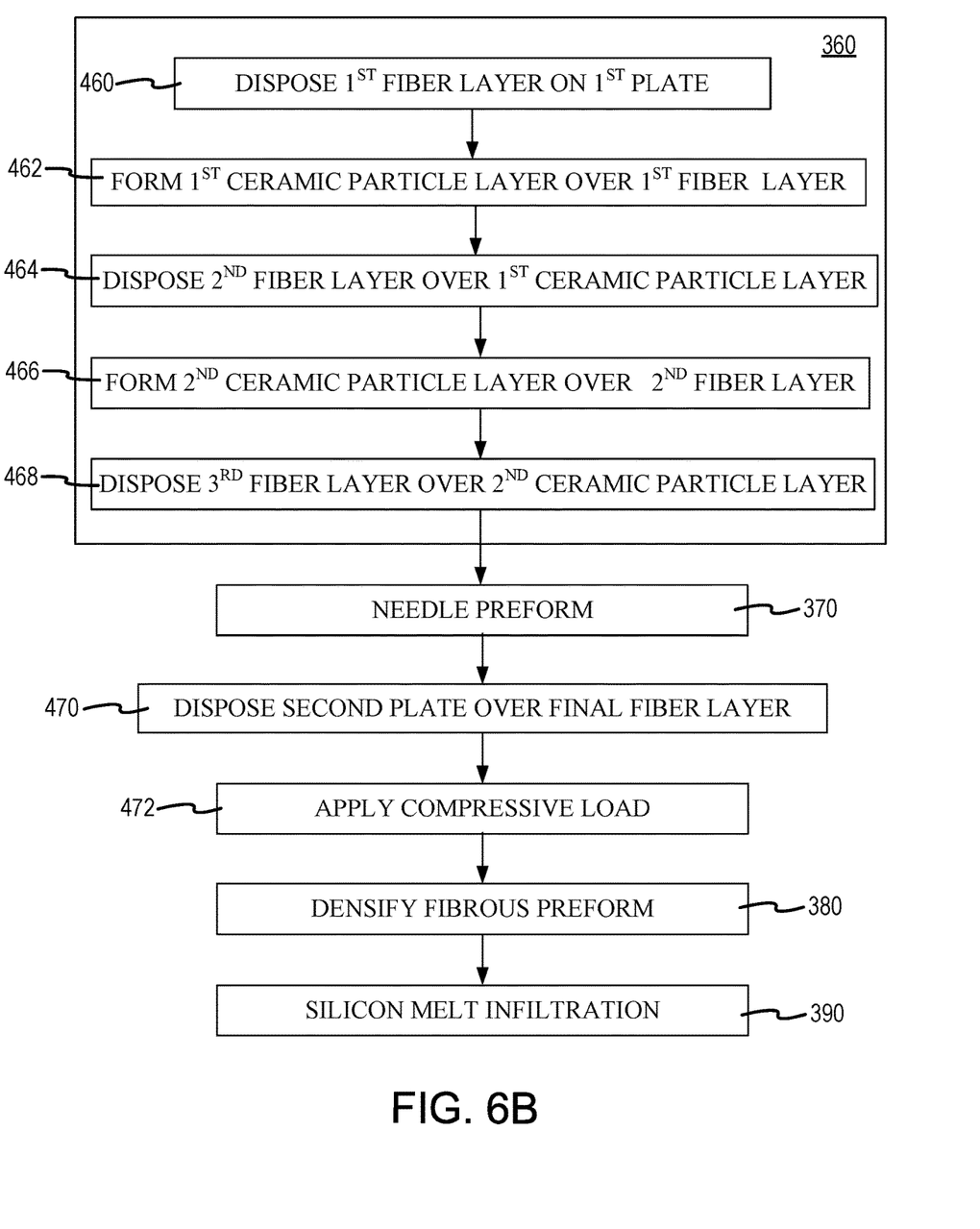

With reference to FIG. 6B, step 360 of method 350 may include disposing a first fiber layer on a first plate (step 460), forming a first ceramic particle layer over the first fiber layer (step 462), disposing a second fiber layer over the first ceramic particle layer (step 464), forming a second ceramic particle layer over the second fiber layer (step 466), and disposing a third fiber layer over the second ceramic particle layer (step 468). As described herein, each of the ceramic particle layers may be comprised of a varying grit size mixture. For instance, the outer-most layers of the ceramic particle layers may comprise a coarser mixture whereas the center layer comprises a finer mixture, or smaller grit size, such that the densification process is performed more uniformly and creates smaller pore sizes toward the middle, thus limiting silicon infiltration.

Once a desired number of fiber layers and ceramic particle layers have been stacked, the fibrous preform is needled (step 370). In various embodiments, after needling, a second plate is located over the final fiber layer (step 470). In various embodiments, a compressive load may be applied to the fibrous preform (step 472). In various embodiments, the compressive load may be applied during the densification step (i.e., during step 380).

Figure 6C:
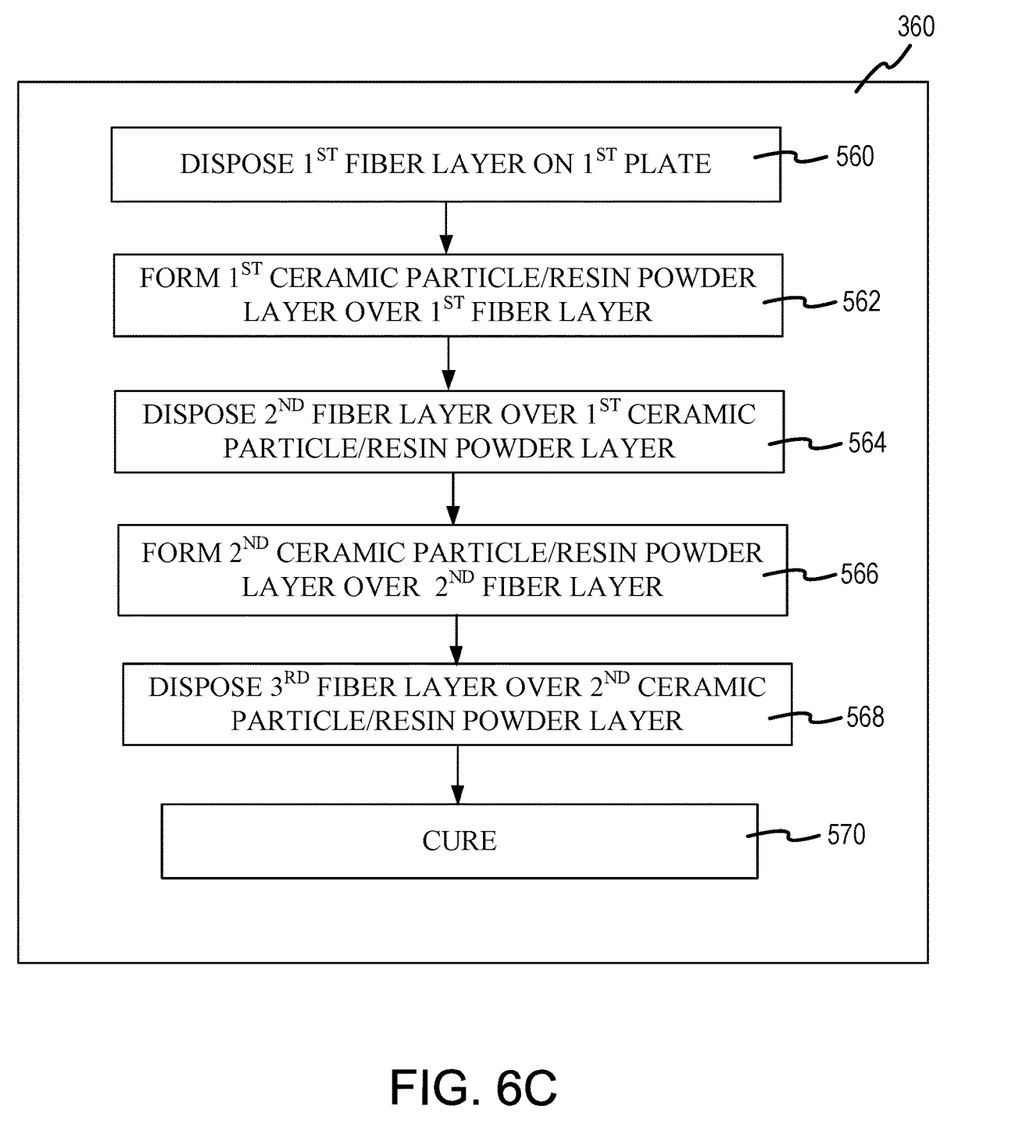

With reference to FIG. 6C, in various embodiments, step 360 may include locating a first fiber layer in a mold (step 560), forming a first layer of ceramic particles and phenolic resin powder over the first fiber layer (step 562), locating a second fiber layer in the mold and over the first layer of ceramic particles and phenolic resin powder layer (step 564), forming a second layer of ceramic particles and phenolic resin powder layer over the second fiber layer (step 566), and locating a third fiber layer over the second layer of ceramic particles and phenolic resin powder (step 568). In various embodiments, once a desired number of fiber layers and ceramic particle resin powder layers have been stacked, the fibrous preform is cured (step 570). In various embodiments, the fibrous preform may be needled prior to curing. In this regard, step 370 in FIG. 6A may be performed prior to step 570 in FIG. 6C. After curing, the fibrous preform is densified (e.g., step 380 in FIG. 6A may be performed after step 570 in FIG. 6C).

In various embodiments, method 350 may also include locating a plurality of carbon/carbon members in the mold or on the first plate, such that the plurality of carbon/carbon members is located through each of the first fiber layer, the second fiber layer, and the third fiber layer. In various embodiments, method 350 may also including forming openings through the carbon/carbon members after densifying the fibrous preform (e.g., after step 380).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of fabricating a composite component, comprising:
    forming a fibrous preform by:
        forming a first ceramic particle layer over a first textile layer, the first ceramic particle layer having a first group of ceramic particles comprising a first volume of boron carbide powder;
        disposing a second textile layer over the first ceramic particle layer;

forming a second ceramic particle layer over the second textile layer, the second ceramic particle layer having a second group of ceramic particles comprising a second volume of boron carbide powder;

disposing a third textile layer over the second ceramic particle layer; and forming a third ceramic particle layer over the third textile layer, the third ceramic particle layer having a third group of ceramic particles comprising a third volume of boron carbide powder, wherein the first group of ceramic particles has a first average particle size, the second group of ceramic particles has a second average particle size, and the third group of ceramic particles has a third average particle size, the second average particle size being less than the first average particle size and the third average particle size being less than the second average particle size; and densifying the fibrous preform.

2. The method of fabricating a composite component of claim 1, wherein the first, second, and third, textile layers comprise carbon fiber.

3. The method of fabricating a composite component of claim 1, wherein the first volume of boron carbide powder has a fourth average particle size, the second volume of boron carbide powder has a fifth average particle size, and the third volume of boron carbide powder has a sixth average particle size, the fifth average particle size being less than the fourth average particle size and the sixth average particle size being less than the fifth average particle size.

4. The method of fabricating a composite component of claim 3, further comprising densifying the fibrous preform for a predetermined period of time to limit silicon infiltration, the predetermined period of time being based on the third average particle size such that pores formed in the third ceramic particle layer are smaller than pores formed in the second ceramic particle layer and the pores formed in the second ceramic particle layer are smaller than the pores formed in the first ceramic particle layer.

5. The method of fabricating a composite component of claim 1, further comprising performing a silicon melt infiltration after densifying the fibrous preform.

6. The method of fabricating a composite component of claim 1, further comprising locating a carbon/carbon member through the fibrous preform.

7. The method of fabricating a composite component of claim 6, further comprising forming an opening through the carbon/carbon member.

8. The method of fabricating a composite component of claim 7, wherein a diameter of the opening is between 25% and 75% of a diameter of the carbon/carbon member.

9. The method of fabricating a composite component of claim 1, further comprising:

disposing the first textile layer on a first plate;

locating a first shim around an outer perimeter of the first textile layer;

locating a second shim around an outer perimeter of the second textile layer;

disposing a second plate over the third textile layer, wherein at least one of the first plate or the second plate includes at least one of a groove or an orifice; and applying a compressive load to the third textile layer.

10. A method of forming a fibrous preform for fabricating a composite component, comprising:

locating a first fiber layer in a mold;

forming a first layer of ceramic particles and phenolic resin powder over the first fiber layer, the first layer of ceramic particles having a first group of boron carbide powder particles;

locating a second fiber layer in the mold and over the first layer of ceramic particles and phenolic resin powder;

forming a second layer of ceramic particles and phenolic resin powder over the second fiber layer, the second ceramic layer of ceramic particles having a second group of boron carbide powder particles;

locating a third fiber layer over the second layer of ceramic particles and phenolic resin powder;

forming a third layer of ceramic particles and phenolic resin powder over the third fiber layer, the third ceramic layer of ceramic particles having a third group of boron carbide powder particles, wherein the first layer of ceramic particles has a first average particle size, the second layer of ceramic particles has a second average particle size, and the third layer of ceramic particles has a third average particle size, the second average particle size being less than the first average particle size and the third average particle size being less than the second average particle size; and curing the fibrous preform.

11. The method of forming a fibrous preform of claim 10, further comprising wherein the first, second, and third, fiber layers comprise carbon fiber.

12. The method of forming a fibrous preform of claim 10, wherein the first group of boron carbide powder particles has a fourth average particle size, the second group of boron carbide powder particles has a fifth average particle size, and the sixth group of boron carbide powder particles has a sixth average particle size, the fifth average particle size being less than the fourth average particle size and the sixth average particle size being less than the fifth average particle size.

13. The method of forming a fibrous preform of claim 12, further comprising curing the fibrous preform for a predetermined period of time to limit silicon infiltration, the predetermined period of time being based on the third average particle size such that pores formed in the third layer of ceramic particles are smaller than pores formed in the second layer of ceramic particles and the pores formed in the second layer of ceramic particles are smaller than the pores formed in the first layer of ceramic particles.

14. The method of claim 10, further comprising locating a plurality of carbon/carbon members in the mold, wherein the plurality of carbon/carbon members is located through each of the first fiber layer, the second fiber layer, and the third fiber layer.

15. The method of claim 10, further comprising needling through the first fiber layer, the second fiber layer, and the third fiber layer to form a plurality of z-direction fibers extending between the first fiber layer and the third fiber layer.

16. The method of claim 15, wherein the first fiber layer, the second fiber layer, and the third fiber layer each have an open weave comprised of between 25% and 75% open area.

17. A method of fabricating a composite component, comprising:

forming a fibrous preform by:

forming a first ceramic particle layer over a first textile layer, the first ceramic particle layer having a first group of ceramic particles;

disposing a second textile layer over the first ceramic particle layer;
forming a second ceramic particle layer over the second textile layer, the second ceramic particle layer having a second group of ceramic particles; and
disposing a third textile layer over the second ceramic particle layer;
densifying the fibrous preform locating a carbon/carbon member through the fibrous preform; and
forming an opening through the carbon/carbon member.

18. A method of forming a fibrous preform for fabricating a composite component, comprising:
locating a first fiber layer in a mold;
forming a first layer of ceramic particles and phenolic resin powder over the first fiber layer, the first layer of ceramic particles having a first group of ceramic particles;
locating a second fiber layer in the mold and over the first layer of ceramic particles and phenolic resin powder;
forming a second layer of ceramic particles and phenolic resin powder over the second fiber layer, the second ceramic layer of ceramic particle having a second group of ceramic particles;
locating a third fiber layer over the second layer of ceramic particles and phenolic resin powder;
locating a plurality of carbon/carbon members in the mold, wherein the plurality of carbon/carbon members is located through each of the first fiber layer, the second fiber layer, and the third fiber layer; and
curing the fibrous preform.

\* \* \* \* \*